2,976,332
ISOMERIZATION OF XYLENES AND ALKYL BENZENES

Leonard N. Leum, Media, and James E. Connor, Jr., Drexel Hill, Pa., assignors to The Atlantic Refining Company, Philadelphia, Pa., a corporation of Pennsylvania No Drawing. Filed Feb. 17, 1958, Ser. No. 715,487

9 Claims. (Cl. 260—668)

This invention relates to a method for isomerizing alkylated benzene hydrocarbons having 8 to 10 carbon atoms in the molecule, wherein the alkyl substituents are methyl or ethyl radicals, or combinations thereof. More specifically, this invention relates to a method for isomerizing methyl or ethyl substituted benzene hydrocarbons containing from 8 to 10 carbon atoms employing a catalyst which is a physical mixture of an inert carrier on which platinum has been deposited and a silica-alumina cracking component, which catalyst exhibits a higher activity over an appreciably longer life span as compared with previously known catalysts for this isomerization reaction.

The use of catalysts for the isomerization of xylenes and similar low molecular weight alkyl benzenes has long been known and many catalysts have been suggested for these processes. In all such processes the catalysts suffered from the defect either of being insufficiently active to promote the isomerization or, if sufficiently active, of too short a life to be of commercial interest.

For example, aluminum chloride promoted with hydrogen chloride was a very early catalyst suggested for this isomerization reaction. This catalyst, however, not only produced rather low yields of isomers with large amounts of tars and similar degradation products, but it also had a very short life. Subsequently, silica-alumina hydrocarbon cracking catalysts were suggested for this isomerization reaction and while these catalysts were superior to aluminum chloride with respect to yield, they too had a very short life and required frequent regeneration because of the high production of coke which became deposited on the catalyst.

Therefore, it is an object of this invention to provide a process for the isomerization of alkyl benzenes having 8 to 10 carbon atoms in the molecule, wherein the alkyl substituents are methyl or ethyl radicals employing a catalyst which has superior activity and retains this activity over long periods of use.

It is a further object of this invention to provide a process for the isomerization of alkyl benzenes having from 8 to 10 carbon atoms in the molecule, wherein the alkyl substituents are methyl or ethyl radicals employing a catalyst which is a physical mixture of an inert carrier on which has been deposited platinum and a silica-alumina cracking component.

It is a further object of this invention to isomerize any one or a mixture of any of the isomeric alkylated benzenes of 8 carbon atoms to produce a mixture of all of the alkylated benzene isomers of 8 carbon atoms.

It is a further object of this invention to isomerize any one or a mixture of any of the isomeric 9 carbon atoms alkylated benzenes consisting of methyl ethyl or trimethyl benzenes to produce a mixture of the other methyl ethyl or trimethyl benzenes of 9 carbon atoms.

Other objects will be apparent from the description and claims which follow.

In accordance with the present invention alkylated benzene hydrocarbons having 8 to 10 carbon atoms in the molecule and wherein the alkyl substituents are methyl or ethyl radicals are treated under rather specific reaction conditions with a catalyst which is a physical mixture of two components; one component being platinum deposited on an inert carrier and the other component being a silica-alumina cracking catalyst. This treatment results in the isomerization of the alkylated benzene hydrocarbons to produce substantially thermodynamic equilibrium mixtures of the various possible isomers. The utility of such a process lies in the fact that the desired isomer may be removed from such a mixture and the remaining isomers recycled to the process to produce additional quantities of the desired isomer, thus substantially all of the original mixture of isomers can be converted eventually into a desired isomer.

A specific example of such a process involves the production of paraxylene from mixtures of the various xylene isomers and ethyl benzene, i.e. the $C_8$ alkylated aromatics. The paraxylene from such a mixture may be removed by low temperature crystallization followed by separation of the liquid isomers from the solid paraxylene by means of filtration or centrifugation. The isomer fraction from which the paraxylene has been removed is then isomerized in accordance with the instant invention to produce a substantially thermodynamic equilibrium mixture of the $C_8$ aromatic isomers from which the paraxylene may be removed and the remaining isomers recycled together with additional charge to the isomerization step to render the process continuous.

The instant isomerization process which employs a highly stable catalyst to be described in detail and an excess of hydrogen may be carried out at temperatures between 700° F. to 1000° F. under pressures of from 50 to 500 pounds per square inch, with space velocities ranging between 0.5 and 6.0 volumes of liquid hydrocarbon charge per volume of catalyst per hour and hydrogen-to-hydrocarbon mol ratios ranging between 1:1 and 20:1. The process is preferably carried out, however, at temperatures between 800° F. and 900° F., under pressures of from 100 to 200 pounds per square inch, space velocities of from 1.0 to 4.0 per volume of catalyst per hour and a hydrogen-to-hydrocarbon mol ratio of from 3:1 to 12:1.

The catalysts to be employed in carrying out the isomerization process of this invention under the conditions described above must be prepared in a specific manner in order that all of the advantages of this invention will be realized. It has been found that if there is manufactured separately a hydrogenation-dehydrogenation catalyst consisting of platinum deposited uniformly on an inert stable carrier and this hydrogenation-dehydrogenation component is physically admixed with a silica-alumina cracking component which has been manufactured separately in a manner such that it will have maximum stability, the combination will exhibit high activity for the above described isomerization reaction over a long period of use and, in addition, if such a catalyst requires regeneration after use its initial activity and stability will be substantially restored.

The inert carrier upon which the platinum is deposited may be any one or a mixture of the commercially available aluminas, such as chi alumina, gamma alumina, eta alumina and alpha alumina mono-hydrate. These aluminas are described in the article "Thermal Transformations of Aluminas and Alumina Hydrates," by H. C. Stumpf, A. S. Russell, J. W. Newsome and C. M. Tucker, in Industrial and Engineering Chemistry, volume 42, page 13928 et seq. (1950). In addition, other inert carriers may be employed such as magnesium oxide, calcium oxide, titanium oxide, silica gel, fuller's earth, kaolin, kieselguhr, diatomaceous earth, bauxite, and naturally occurring adsorbent clays. The various materials which may be used as the inert carrier differ in their ability to absorb or adsorb platinum compounds from solution and, therefore, these carriers are not all equally effective for the purpose of this invention. A particularly effective carrier is alumina having a surface area of from 50 to 400 square meters per gram as measured by the nitrogen adsorption method of Brunnauer, Emmett and Teller found in the Journal of the American Chemical Society, volume 60, pages 309 et seq. (1938).

The silica-alumina cracking component of the catalyst is preferably a commercial synthetic silica-alumina cracking catalyst containing from 7 percent to 30 percent by weight of alumina, the remainder being silica. The commercial synthetic silica-alumina cracking catalysts containing from 12 percent to 25 percent by weight of alumina, currently in use in the petroleum industry in cracking processes are particularly suitable for the manufacture of the catalyst herein described.

The silica-alumina cracking component may be either freshly prepared cracking catalyst or it may be a catalyst which has had its activity altered. The activity of a cracking catalyst may be measured by a distillate-plus-loss (D+L) scale according to the method of Birkhimer et al., "A Bench Scale Test Method for Evaluating Cracking Catalysts," Proceedings of the American Petroleum Institute, Division of Refining, volume 27 (III), page 90 (1947). According to the Birkhimer et al. D+L activity measurement method, it would be possible to have a theoretical maximum D+L of 100; however, in general, the maximum D+L for a fresh synthetic silica-alumina cracking catalyst will range between 90 and 95. While there are a number of other methods of measuring the catalytic cracking activity of synthetic silica-alumina cracking catalysts which have been described in the literature, these methods employ a D+L measure having much lower values for a fresh silica-alumina cracking catalyst, usually of the order of 45 to 65 depending upon the particular test. Accordingly, when there is specified D+L scale having a practicable maximum activity of 90 to 95 the Birkhimer et al. method is being employed.

A number of methods for altering the cracking activity of synthetic silica-alumina cracking catalysts have been described; however, the preferred method for the catalyst of the instant invention is treatment of the catalyst with steam at temperatures of from 900° F. to 1400° F., at pressures ranging from atmospheric to several hundred pounds per square inch, for a period of time sufficient to provide the desired degree of alteration.

The methods of preparing synthetic silica-alumina cracking catalysts have been published widely in both the patented art and the technological literature and since the exact method of preparing the cracking catalyst component is not a part of this invention, discussions thereof will be omitted.

It has been found that the cracking component most suitable for use in preparing the catalysts for promoting the isomerization of the alkyl benzene hydrocarbons of this invention should have an activity ranging between 45 D+L and 90 D+L, as measured by the Birkhimer et al. method. The catalysts having the 90 D+L activity are further characterized by having a surface area of the order of 400 to 425 square meters per gram, as measured by the aforementioned method of Brunnauer, Emmett and Teller. A silica-alumina catalyst which has had its activity reduced so that it has a D+L of about 45 will have a surface area of approximately 80 square meters per gram. Accordingly, the silica-alumina component of the catalyst suitable for the process of this invention may be described also as having a surface area ranging between 80 square meters per gram and 400 to 425 square meters per gram. Within this range of activities for the silica-alumina cracking component, it has been found that there is a more highly preferred range of from 45 to 75 D+L with the corresponding surface areas of from 80 to 225 square meters per gram, respectively.

The platinum may be deposited onto the carrier from an aqueous solution of one of its compounds; for example, it may be deposited from an aqueous solution of chloroplatinic acid, platinous tetrammino chloride, platinous tetrammino hydroxide, platinic hexammino hydroxide, platinic hexammino chloride, chloroplatinous acid, platinic chloride, ammonium chloroplatinate, and similar platinum-containing solutions.

After contacting the inert carrier with the solution of the platinum compound, the excess solution, if any, is removed and the carrier dried. If desired, platinum may be reduced to the metallic state at this point by air calcination or hydrogen reduction in accordance with well known methods. The amount of the metallic platinum which may be deposited on the carrier may range from 0.1 percent by weight to 2.5 percent by weight, calculated on the basis of the weight of the final catalyst. Preferably, the amount of platinum should range between 0.5 percent by weight and 1.5 percent by weight on the basis of the final catalyst.

In order to convert the platinum of the compound to the metallic state, the carrier after deposition of the metal compound thereon may be dried and then calcined with air at temperatures ranging between 500° F. and 1100° F., or treated with hydrogen at 400° F. to 1000° F., following which the carrier with the deposited metal is admixed with particles of the silica-alumina component. If it is desired, however, after the deposition and drying steps, the carrier may be admixed with the cracking component and then the admixture subjected to calcination or hydrogen reduction to convert the platinum to the metallic state.

The physically admixed cracking component and carrier component having the platinum deposited thereon, may be pelleted or extruded according to conventional methods to produce masses suitable for use in fixed bed catalytic isomerization processes.

In order to pellet the mixture of components, it has been found that for best results, the individual components should first be reduced to a particle size of the order not exceeding one millimeter maximum cross sectional dimension, preferably, they are reduced to a powder capable of being passed through an 80 mesh U.S. Standard sieve. It has been found that the carrier component upon which the platinum is deposited may range between 5 percent and 75 percent by weight of the final catalyst. The most preferred composite, however, is obtained when the weight of the sorbent carrier component is approximately that of the silica-alumina component, i.e. each component constitutes approximately 50 percent of the mixture by weight.

In order to demonstrate the utility of the instant invention for the isomerization of xylenes and to show the preferred range of activities of the silica-alumina component of the catalyst, a number of experiments were conducted employing catalysts which differed in the activity level of their silica-alumina component.

EXAMPLE I

A hydrocarbon fraction rich in xylenes (see analysis under "composition I" in Table I), together with hydrogen was passed over a catalyst consisting of a pelleted mixture of 50 percent by weight of a fresh (90 D+L), commercial silica-alumina cracking catalyst (approximately 12–13 percent by weight of alumina) and 50 percent by weight of a platinized alumina component (Aluminum Company of America, F–10 grade, consisting of a mixture of chi and gamma aluminas on which had been deposited 0.51 percent of platinum, based on the weight of the final catalyst, from a chloroplatinic acid solution). The reaction conditions were: temperature, 900° F.; pressure, 175 pounds per square inch; liquid hourly space velocity, 1.0; hydrogen-to-hydrocarbon mol ratio, 10:1. The results of this treatment are set forth in Table I under experiment number 1. (All analyses by mass spectrometer and in weight percent.)

to reduce its activity to this level and the platinum content of the catalyst was 0.55 percent. The results are shown in Table I under experiment number 5. (All analyses by mass spectrometer and in weight percent.)

*Table I*

| Experiment Number | | 1 | 2 | | 3 | 4 | | 5 |
|---|---|---|---|---|---|---|---|---|
| Charge, Composition | I | I | I | II | II | I | III | III |
| D+L of Silica-Alumina Component | | 90 | 75 | | 60 | 46 | | 35 |
| Surface area of Silica-Alumina, sq.M./gram | | 400–425 | 225 | | 140 | 84 | | 56 |
| $C_1$–$C_5$ paraffins | | 6.0 | 6.9 | | 2.04 | 4.8 | | 3.9 |
| $C_6$ and heavier paraffins | 1.9 | 1.0 | 0.4 | 2.1 | 1.25 | 2.2 | 0.9 | 0.2 |
| $C_6$ and heavier cycloparaffins | 3.8 | 0.8 | 0.5 | 1.8 | 0.23 | 1.7 | 0.4 | 0.1 |
| benzene | | 2.9 | 2.7 | 0.6 | 1.09 | 2.4 | 0.3 | 0.5 |
| toluene | 0.3 | 10.3 | 7.6 | 2.6 | 5.87 | 5.7 | 0.5 | 4.2 |
| mol. wt. 120 ($C_9$ aromatic fraction) | | 9.7 | 6.8 | ¹0.1 | ¹2.35 | 1.3 | | 1.4 |
| mol. wt. 134+ ($C_{10}$ and heavier aromatic fraction) | | 1.2 | 0.7 | | | 0.2 | | 0.2 |
| mol. wt. 106 ($C_8$ aromatic fraction) | | 67.9 | 74.4 | 92.8 | 87.17 | 81.6 | | 89.6 |
| ethyl benzene | 12.8 | 3.8 | 3.2 | 5.0 | 6.62 | 2.0 | 10.3 | 9.8 |
| ortho xylene | 30.3 | 17.7 | 19.6 | 20.6 | 19.85 | 23.0 | 31.5 | 25.7 |
| meta xylene | 44.5 | 31.0 | 34.0 | 54.3 | 42.60 | 37.5 | 47.8 | 38.2 |
| para xylene | 6.4 | 15.4 | 17.6 | 12.9 | 18.10 | 19.1 | 8.3 | 15.9 |
| Percent para xylene in M.W. 106 | | 22.7 | 23.7 | | 20.73 | 23.4 | | 17.8 |
| Total Liquid Recovery, Wt. Percent | | 95.8 | 95.8 | | 97.9 | 94.5 | | 96.1 |

¹ Includes the heavier aromatics also.

EXAMPLE II

The same xylene-rich hydrocarbon fraction as in Example I, under the same reaction conditions as in Example I was passed over a catalyst which was the same as that of Example I except that the silica-alumina component had a cracking activity level of 75 D+L (225 square meters per gram surface area) produced by steaming the fresh commercial silica-alumina catalyst to reduce its activity to this level. The results are shown in Table I under experiment number 2. (All analyses by mass spectrometer and in weight percent.)

EXAMPLE III

A hydrocarbon fraction rich in xylenes (see analysis under "composition II" in Table I) together with hydrogen was passed over a catalyst consisting of a pelleted mixture of 50 percent by weight of a silica-alumina cracking component (approximately 13 percent by weight alumina) which had been treated with steam to reduce its activity to 60 D+L (140 square meters per gram surface area) and 50 percent by weight of a platinized eta alumina (0.60 percent of platinum, based on the weight of the final catalyst, deposited from an aqueous platinous tetrammino hydroxide solution). The reaction conditions were: temperature, 900° F.; pressure, 175 pounds per square inch; space velocity, 1.5; hydrogen-to-hydrocarbon mol ratio, 9.5:1. The results of this experiment are set forth in Table I under experiment number 3. (All analyses by mass spectrometer and in weight percent.)

EXAMPLE IV

The same xylene-rich hydrocarbon fraction as in Example I, under the same reaction conditions as in Example I was passed over a catalyst which was the same as that of Example I except that the silica-alumina component had a cracking activity level of 46 D+L (84 square meters per gram surface area) produced by steaming the fresh commercial silica-alumina catalyst to reduce its activity to this level and the platinum content of the catalyst was 0.60 percent. The results are shown in Table I under experiment number 4. (All analyses by mass spectrometer and in weight percent.)

EXAMPLE V

A hydrocarbon fraction rich in xylenes (see analysis under "composition III" in Table I) together with hydrogen, under the same reaction conditions as in Example I, was passed over a catalyst which was the same as that of Example I except that the silica-alumina component had a cracking activity level of 35 D+L (56 square meters per gram surface area) produced by steaming the fresh, commercial silica-alumina catalyst The results of these experiments demonstrate that a xylene-rich hydrocarbon fraction which contains less than the equilibrium amount of one of the isomers (paraxylene in these examples) may be isomerized by the process of this invention to produce nearly the thermodynamic equilibrium mixture of the isomers (note increase in paraxylene content) and that the activity level of the silica-alumina component of the catalyst should range between 45 D+L and 90 D+L (80 and 400 to 425 square meters per gram surface area) and preferably the level should be between 45 D+L and 75 D+L (80 and 225 square meters per gram surface area).

Since single-component catalysts such as platinum on silica-alumina have been described as being suitable for the isomerization of xylenes, comparative tests were run to determine whether the high stability, two component catalysts employed in the process of the instant invention had comparable activity to the less stable platinum-containing catalysts employed heretofore.

EXAMPLE VI

The same xylene-rich hydrocarbon fraction as in Example I, together with hydrogen, was passed over a catalyst consisting of a pelleted mixture of 50 percent by weight of a silica-alumina cracking component (approximately 13 percent by weight alumina) which had been treated with steam to reduce its activity to 75 D+L (225 square meters per gram surface area) and 50 percent by weight of a platinized alumina (alpha alumina trihydrated calcined at 900° F. to produce a mixture of approximately 90 percent by weight chi alumina and approximately 10 percent by weight gamma alumina). The platinum was deposited on the alumina from an aqueous platinous tetrammino hydroxide solution in an amount such that there was 0.56 percent platinum by weight based on the weight of the final catalyst. The reaction conditions were: pressure 175 pounds per square inch; space velocity, 1.0; hydrogen-to-hydrocarbon mol ratio, 10 : 1. The temperatures employed and the results obtained are shown in Table II under experiment number 6 and number 6A, respectively. (All anaylses by mass spectrometer and in weight percent.)

EXAMPLE VII

The hydrocarbon fraction rich in xylenes (see analysis under comp. IV in Table II), together with hydrogen, was passed over a catalyst consisting of a platinized silica-alumina cracking catalyst, the silica-alumina portion of which had a cracking activity level of 70 D+L (215 square meters per gram surface area) produced by steaming the fresh commercial silica-alumina catalyst to reduce its activity to this level. Approximately 0.46 percent platinum based on the weight of the final catalyst was deposited on the silica-alumina on the same type platinum solution as for Example VI. The reaction conditions employed were exactly the same as the conditions employed in Example VI and the results at two different temperatures are set forth in Table II under experiment number 7 and 7A, respectively.

Table II

| Experiment No. | 6 | 6A | | 7 | 7A |
|---|---|---|---|---|---|
| Charge | I | I | Composition IV | | |
| Temperature, °F | 850 | 900 | | 850 | 900 |
| Total Paraffins | 7.9 | 8.0 | 0.5 | 2.7 | 2.1 |
| Total Cyclo-Paraffins | 3.0 | 1.8 | 0.6 | 1.2 | 0.4 |
| Benzene | 1.8 | 1.8 | 0.5 | 1.1 | 2.0 |
| Toluene | 9.0 | 6.2 | | 3.3 | 5.0 |
| Mol. Wt. 120 (C₉ Aromatic Fraction) | 1.6 | 2.2 | 0.1 | 3.6 | 4.9 |
| Mol. Wt. 134 (C₁₀ Heavier Aromatic Fractions) | 0.6 | 0.3 | | 0.7 | 0.9 |
| Mol. Wt. 106 | 76.1 | 79.7 | | 87.4 | 84.8 |
| Ethylbenzene | 5.2 | 4.9 | 19.6 | 11.0 | 14.4 |
| Orthoxylene | 20.5 | 21.6 | 31.9 | 20.6 | 20.2 |
| Metaxylene | 34.2 | 35.3 | 46.1 | 37.0 | 33.0 |
| Paraxylene | 16.2 | 17.9 | 0.7 | 18.8 | 17.2 |
| Percent Paraxylene in mol. wt. 106 | 21.3 | 22.4 | | 21.5 | 20.3 |
| Total Liquid Recovery, weight percent | 93.5 | 94.6 | | 96.5 | 96.7 |

The data in Table II show that the stable two-component catalyst has an isomerization activity equal to that of the platinized silica-alumina catalysts described heretofore.

Since the life span of the ordinary platinized silica-alumina catalyst for the isomerization of xylene and alkyl aromatics is normally of the order of several weeks to 2 or 3 months and since the catalyst which is employed in the process of the instant invention is stable for a length of time many fold that of ordinary catalysts used for this isomerization process, it was found necessary to devise an accelerated test procedure which would show differences in the stability of catalysts in a reasonable length of time. Since isomerization is one of the reactions involved in catalytic reforming of mixtures of hydrocarbons which contain alkyl aromatics and since these mixtures of hydrocarbons when passed over isomerization catalysts have a much faster and greater deactivating effect on the catalysts, a stability test was devised which employed mixtures of hydrocarbons normally charged to reforming processes as the charge for the test and in addition the test was conducted under extremely severe reaction conditions. Under the conditions of this test, differences in stability were shown clearly and quickly.

In the stability test 50 milliliters of the pelleted catalyst is crushed to 8-12 U.S. Standard sieve size and placed as a fixed bed in a reactor having internal diameter of approximately one inch. A distillate from an East Texas crude source having the following properties:

ASTM distillation:
  Overpoint _____°F__ 180
  50 percent _____°F__ 250
  95 percent _____°F__ 330
  Endpoint _____°F__ 365
Clear octane number (ASTM method D908-53)__ 55
API gravity at 60° F_____ 56.5 is passed over the catalyst under the following conditions: inlet temperature to the catalyst bed, 960° F.; average temperature at the center of the bed and throughout its length, 900° F.; liquid hourly space velocity, 8: pressure, 500 pounds per square inch: hydrogen-to-hydrocarbon mol ratio, 8.5:1; duration of the test, 110 hours. Samples of the liquid product are taken at regular timed intervals during run time and octane numbers (CFRR-O), API gravity and aniline points determined. In the petroleum industry, catalyst stability or life span is expressed in barrels of feed stock charged throughout a complete commercial run per pound of catalyst contained in the unit during such run. For convenience, therefore, the test data obtained as a result of the foregoing stability test were correlated with commercial plant data in order that the stability data could be expressed in "barrels per pound."

EXAMPLE VIII

Two samples of commercial silica-alumina cracking catalyst (approximately 13 percent by weight of alumina) were treated with steam to reduce their activity to 60 D+L (140 square meters per gram surface area). One portion of the deactivated silica-alumina was pelleted and platinized directly to give a finished catalyst containing 0.75 percent by weight of platinum based on the weight of the final catalyst. The second portion of the silica-alumina was admixed with an equal weight of Aluminum Company of America F-10 activated alumina (the same as in Example I) which had been platinized such that the final catalyst contained 0.52 percent by weight of platinum. The mixture of deactivated silica-alumina and platinized alumina was pelleted. The two catalysts were then tested in the above described stability test; the platinized silica-alumina catalyst had a stability of 18.8 barrels per pound, while the catalyst of the type employed in the process of the instant invention consisting of a mixture of platinized alumina and silica-alumina had a stability of 64.8 barrels per pound. These results demonstrate conclusively the fact that the catalysts employed in the process of the instant invention have a stability many fold that of prior.

In order to determine the comparative stability after regeneration of the catalyst employed in the process of the instant invention as compared with the stability after regeneration of the catalyst used for this isomerization process heretofore, the following stability test was employed:

A distillate fraction from a West Texas Devonian-Permean crude source having the following properties.

ASTM distillation:
  Overpoint _____°F__ 110
  5 percent _____°F__ 158
  10 percent _____°F__ 180
  20 percent _____°F__ 206
  50 percent _____°F__ 262
  80 percent _____°F__ 334
  90 percent _____°F__ 418
  95 percent _____°F__ 510
  Endpoint _____°F__ 510
Recovery _____percent__ 95.5
Residue _____do____ 3.5 was passed over fifty grams of catalyst which had been reduced to a 8-12 mesh U.S. Standard sieve contained in an approximately one inch internal diameter reactor in the form of a fixed bed. The catalyst after reduction with hydrogen was activated for one hour with nitrogen at 950° F. The hydrocarbon distillate fraction was then passed over the catalyst at 950° F. at the rate of 2 milliliters per minute for 12 minutes. Since no hydrogen was present, the catalyst became coked during this treatment; consequently, following the 12 minute on stream time, the catalyst was purged with nitrogen at the rate of 76 cc. per minute for 39 minutes, burned with a mixture of air at the rate of 160 cc. per minute and nitrogen at the rate of 640 cc. per minute for a total of 304 minutes for the air-nitrogen mixture and, finally, the catalyst was purged with nitrogen at 76 cc. per minute for five minutes.

This constituted a cracking and regeneration cycle and this cycle was repeated six more times for a total of seven cycles. After the seventh cycle, however, the catalyst was burned with air at 800 cc. per minute for four hours. The catalyst was then tested in the same manner as in the stability test described for the fresh catalyst with the exception that instead of running for 110 hours the onstream time was only for six hours. Again the octane numbers and other data were collected and compared with the regeneration stability of catalyst which had been employed in plant scale runs.

Under these conditions it was found that the barrels per pound obtained in the fresh catalyst stability test for the platinized silica-alumina should be multiplied by a factor of 1.4 to give the total stability of such a catalyst, including its fresh stability and its regeneration stability; thus, the platinized silica-alumina catalyst described in Example VIII which had a fresh stability of 18.8 barrels per pound had a total stability including the regeneration stability of 18.8×1.4, or 26.3 barrels per pound. In the case of the two-component catalyst processes of the instant invention, it was found that the fresh stability of the catalyst should be multiplied by a factor of five in order to obtain the total stability, i.e., the fresh and regeneration stabilities; thus, the two-component catalyst of Example VIII which had a fresh stability of 64.8 barrels per pound would have a total stability, including regeneration stability, of 324 barrels per pound.

It will be apparent from these data that on the average the two-component catalyst used in the process of the instant invention will have a life at least twelve times as long as that of the catalysts employed heretofore.

We claim:

1. The method of isomerizing alkylated benzene hydrocarbons having 8 to 10 carbon atoms in the molecule wherein the alkyl substituents are selected from the group consisting of methyl and ethyl radicals which comprises contacting at least one such alkylated benzene hydrocarbon in the presence of excess hydrogen and under isomerization conditions with a catalyst consisting essentially of a physical admixture of an inert carrier on which has been deposited 0.1 percent to 2.5 percent by weight of platinum based on the weight of the final catalyst and a silica-alumina cracking component, the carrier and platinum component being present in an amount ranging between 5 percent and 75 percent by weight of the final catalyst, the silica-alumina cracking component containing from 7 percent to 30 percent by weight of alumina and having a surface area ranging between 80 and 400 to 425 square meters per gram and being substantially entirely devoid of platinum.

2. A method of isomerizing alkylated benzene hydrocarbons having 8 to 10 carbon atoms in the molecule wherein the alkyl substituents are selected from the group consisting of methyl and ethyl radicals which comprises contacting at least one such alkylated benzene hydrocarbon in the presence of excess hydrogen at a temperature between 700° F. and 1000° F., a pressure of from 50 to 500 pounds per square inch, a liquid hourly space velocity of 0.5 to 6.0 and a hydrogen-to-hydrocarbon mol ratio of 1:1 to 20:1, with a catalyst consisting essentially of a physcial admixture of an inert carrier on which has been deposited 0.1 percent to 2.5 percent by weight of platinum based on the weight of the final catalyst and a silica-alumina cracking component, the carrier and platinum component being present in an amount ranging between 5 percent and 75 percent by weight of the final catalyst, the silica-alumina cracking component containing from 7 percent to 30 percent by weight of alumina and having a surface area ranging between 80 and 400 to 425 square meters per gram and being substantially entirely devoid of platinum.

3. A method of isomerizing alkylated benzene hydrocarbons having 8 to 10 carbon atoms in the molecule wherein the alkyl substituents are selected from the group consisting of methyl and ethyl radicals which comprises contacting at least one such alkylated benzene hydrocarbon in the presence of excess hydrogen at a temperature between 800° F. and 900° F., a pressure of from 100 to 200 pounds per square inch, a liquid hourly space velocity of 1.0 to 4.0 and a hydrogen-to-hydrocarbon mol ratio of 3:1 to 12:1, with a catalyst consisting essentially of a physical admixture of an inert carrier on which has been deposited 0.1 percent to 2.5 percent by weight of platinum based on the weight of the final catalyst and a silica-alumina cracking component, the carrier and platinum component being present in an amount ranging between 5 percent and 75 percent by weight of the final catalyst, the silica-alumina cracking component containing from 7 percent to 30 percent by weight of alumina and having a surface area ranging between 80 and 400 to 425 square meters per gram and being substantially entirely devoid of platinum.

4. The method according to claim 1 wherein the inert carrier is alumina.

5. The method according to claim 2 wherein the inert carrier is alumina.

6. The method according to claim 3 wherein the inert carrier is alumina.

7. The method of isomerizing alkylated benzene hydrocarbons having 8 to 10 carbon atoms in the molecule wherein the alkyl substituents are selected from the group consisting of methyl and ethyl radicals which comprises contacting at least one such alkylated benzene hydocarbon in the presence of excess hydrogen and under isomerization conditions with a catalyst consisting essentially of a physical admixture of alumina on which has been deposited 0.5 percent to 1.5 percent by weight of platinum based on the weight of the final catalyst and a silica-alumina cracking component containing from 7 percent to 30 percent by weight of alumina and having a surface area ranging between 80 and 225 square meters per gram and being substantially entirely devoid of platinum, the weight of the alumina and platinum component being approximately equal to the weight of the silica-alumina cracking component.

8. The method of isomerizing alkylated benzene hydrocarbons having 8 to 10 carbons atoms in the molecule wherein the alkyl substituents are selected from the group consisting of methyl and ethyl radicals which comprises contacting at least one such alkylated benzene hydrocarbon in the presence of excess hydrogen at a temperature between 700° F. and 1000° F., a pressure of from 50 to 500 pounds per square inch, a liquid hourly space velocity of 0.5 to 6.0 and a hydrogen-to-hydrocarbon mol ratio of 1:1 to 20:1, with a catalyst consisting essentially of a physical admixture of alumina on which has been deposited 0.5 percent to 1.5 percent by weight of platinum based on the weight of the final catalyst and a silica-alumina cracking component containing from 7 percent to 30 percent by weight of alumina and having a surface area ranging between 80 and 225 square meters per gram and being substantially entirely devoid of platinum, the weight of the alumina and platinum component being approximately equal to the weight of the silica-alumina cracking component.

9. A method of isomerizing alkylated benzene hydrocarbons having 8 to 10 carbon atoms in the molecule wherein the alkyl substituents are selected from the group consisting of methyl and ethyl radicals which comprises contacting at least one such alkylated benzene hydrocarbon in the presence of excess hydrogen at a temperature between 800° F. and 900° F., a pressure of from 100 to 200 pounds per square inch, a liquid hourly space velocity of 1.0 to 4.0 and a hydrogen-to-hydrocarbon mol ratio of 3:1 to 12:1, with a catalyst consisting essentially of a physical admixture of alumina on which has been deposited 0.5 percent to 1.5 percent by weight of platinum based on the weight of the final catalyst and a silica-alumina cracking component containing from 7 percent to 30 percent by weight of alumina and having a surface area ranging between 80 and 225 square meters per gram and being substantially entirely devoid of platinum, the weight of the alumina and platinum component being approximately equal to the weight of the silica-alumina cracking component.

(References on following page)

References Cited in the file of this patent

UNITED STATES PATENTS

| | | |
|---|---|---|
| 2,741,646 | Clark | Apr. 10, 1956 |
| 2,775,628 | Nicholson et al. | Dec. 25, 1956 |
| 2,780,603 | Burton | Feb. 5, 1957 |
| 2,838,445 | Teter et al. | June 10, 1958 |
| 2,854,401 | Weisz | Sept. 30, 1958 |
| 2,899,382 | Myers | Aug. 11, 1959 |

FOREIGN PATENTS

| | | |
|---|---|---|
| 744,467 | Great Britain | Feb. 8, 1956 |
| 768,721 | Great Britain | Feb. 20, 1957 |
| 781,732 | Great Britain | Aug. 21, 1957 |